(12) United States Patent
Rylov et al.

(10) Patent No.: US 9,817,821 B2
(45) Date of Patent: Nov. 14, 2017

(54) TRANSLATION AND DICTIONARY SELECTION BY CONTEXT

(71) Applicant: ABBYY InfoPoisk LLC, Moscow (RU)

(72) Inventors: Alexander Gennadievich Rylov, Moscow (RU); Ivan Sergeevich Arkhipov, Moscow Region (RU)

(73) Assignee: ABBYY DEVELOPMENT LLC, Moscow (RU)

( * ) Notice: Subject to any disclaimer, the term of this patent is extended or adjusted under 35 U.S.C. 154(b) by 0 days.

(21) Appl. No.: 14/653,223

(22) PCT Filed: Dec. 19, 2012

(86) PCT No.: PCT/RU2012/001082
§ 371 (c)(1),
(2) Date: Jun. 17, 2015

(87) PCT Pub. No.: WO2014/098640
PCT Pub. Date: Jun. 26, 2014

(65) Prior Publication Data
US 2015/0331855 A1 Nov. 19, 2015

(51) Int. Cl.
*G06F 17/28* (2006.01)
*G06F 17/27* (2006.01)

(52) U.S. Cl.
CPC ........ *G06F 17/289* (2013.01); *G06F 17/2735* (2013.01); *G06F 17/28* (2013.01)

(58) Field of Classification Search
CPC .. G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881
USPC ......................................... 704/2–8
See application file for complete search history.

(56) References Cited

U.S. PATENT DOCUMENTS

| | | | | | |
|---|---|---|---|---|---|
| 5,687,383 | A | * | 11/1997 | Nakayama | G06F 17/2827 704/2 |
| 6,161,083 | A | * | 12/2000 | Franz | G06F 17/271 704/4 |
| 6,912,527 | B2 | * | 6/2005 | Shimano | G06F 17/30247 |
| 8,078,450 | B2 | | 12/2011 | Anisimovich et al. | |
| 8,145,473 | B2 | | 3/2012 | Anisimovich et al. | |
| 8,276,067 | B2 | * | 9/2012 | Rujan | G06F 17/3071 715/273 |
| 8,311,973 | B1 | * | 11/2012 | Zadeh | G06N 7/02 706/62 |

(Continued)

*Primary Examiner* — Lamont Spooner
(74) *Attorney, Agent, or Firm* — Lowenstein Sandler LLP

(57) ABSTRACT

Methods are described for translation of one or more words in a source language into a target language based on context, history and meaning of portions of the source text. Translation may involve selection of electronic dictionaries when translating from a source language to one or more target languages. Various aspects of history, context and structures of words that reflect lexical, morphological, syntactic, and semantic properties facilitate selection or presentation of translations and options to a user. The methods are applicable to genre classification, topic detection, news analysis, authorship analysis, internet searches, and creating corpora for other tasks, etc.

20 Claims, 9 Drawing Sheets

(56) References Cited

U.S. PATENT DOCUMENTS

| | | | | |
|---|---|---|---|---|
| 8,645,120 B2* | 2/2014 | Elliot | G06F 17/28 | 704/2 |
| 8,832,075 B2* | 9/2014 | Green | G06F 17/3064 | 707/713 |
| 8,886,583 B2* | 11/2014 | Fukazawa | G06F 17/30029 | 706/46 |
| 2002/0161569 A1* | 10/2002 | Itoh | G06F 17/2836 | 704/2 |
| 2003/0040900 A1* | 2/2003 | D'Agostini | G06F 17/2836 | 704/2 |
| 2004/0044517 A1* | 3/2004 | Palmquist | G06F 17/2809 | 704/7 |
| 2004/0102957 A1* | 5/2004 | Levin | G06F 17/2735 | 704/3 |
| 2005/0055217 A1* | 3/2005 | Sumita | G06F 17/2827 | 704/277 |
| 2008/0177531 A1* | 7/2008 | Nakagawa | G06F 17/2715 | 704/9 |
| 2008/0262828 A1* | 10/2008 | Och | G06F 17/2818 | 704/3 |
| 2008/0288240 A1* | 11/2008 | D'Agostini | G06F 17/2836 | 704/3 |
| 2009/0012776 A1* | 1/2009 | Chino | G06F 17/2827 | 704/7 |
| 2009/0326913 A1* | 12/2009 | Simard | G06F 17/2836 | 704/2 |
| 2012/0010870 A1 | 1/2012 | Selegey et al. | | |
| 2012/0123765 A1* | 5/2012 | Estelle | G06F 17/2818 | 704/3 |
| 2012/0150529 A1* | 6/2012 | Kim | G06F 17/289 | 704/2 |
| 2013/0006613 A1* | 1/2013 | Karov Zangvil | G06F 3/0237 | 704/9 |
| 2013/0041652 A1* | 2/2013 | Zuev | G06F 17/2755 | 704/8 |
| 2013/0144594 A1* | 6/2013 | Bangalore | G06F 17/2836 | 704/2 |
| 2015/0134320 A1* | 5/2015 | Rangarajan Sridhar | G06F 17/2775 | 704/2 |
| 2015/0278197 A1* | 10/2015 | Bogdanova | G06F 17/2785 | 704/9 |
| 2015/0356076 A1* | 12/2015 | Herrera | G06F 17/289 | 704/2 |
| 2016/0085748 A1* | 3/2016 | Goto | G06F 17/2818 | 704/4 |
| 2016/0140123 A1* | 5/2016 | Chang | G06F 17/3043 | 707/760 |
| 2016/0147736 A1* | 5/2016 | Danielyan | G06F 17/2785 | 704/9 |
| 2016/0162575 A1* | 6/2016 | Eck | G06F 17/2827 | 707/776 |

* cited by examiner

TRANSLATION AND DICTIONARY SELECTION BY CONTEXT

CROSS REFERENCE TO RELATED APPLICATIONS

This application is the U.S. National Stage of International Application No. PCT/RU2012/001082, filed Dec. 19, 2012, the entire contents of which is hereby incorporated by reference.

BACKGROUND OF THE INVENTION

Field

Implementations of the present invention relate to natural language processing. In particular, implementations relate to selection of a desired, best or correct translation of a word or combination of words, allowing for context and subject matter of surrounding text in general and words in particular to influence selection.

Description of the Related Art

Most words in any language may have several lexical meanings, including homonyms, homographs, grammatical variants (different parts of speech), different semantic meanings in general, and different semantic meanings in different fields, etc. The process where a human translator translates a text generally assumes allowance for context and the subject matter of the translation. The subject matter of the translation implies a certain area of human knowledge to which the text for translation generally applies. This could be jurisprudence (law), chemistry, construction, social science, medicine, automobiles, business and so on. Context implies what comes around a specific word in a text and which forms a specific, nuanced meaning for this word. For example, in the expression "he went into the bank", the word "bank" could mean many things including "a building in which a financial institution is located." In the expression "he placed his money in the bank", however, the word "bank" means specifically the "financial institution" itself, not the specific physical structure of a "bank." But, in the sentence "they walked along the river bank", the word "bank" doesn't relate to any financial institution.

Generally, according to the subject matter of a translation and the context for its use, words in a foreign language must be translated in accordance with meaning or sense that are specific for the particular subject matter and the surroundings that form the context.

When completing a translation with an electronic dictionary, a translator (e.g., a person) usually manually chooses the meaning of a translation variant by selecting a certain specialized dictionary in which descriptions are given of translations of notions used in a given field, or of a particular word meaning from a dictionary entry, based on an understanding of the context for use. Using computer programs, translators can select a proper specialized dictionary only in cases when a "subject field" of a text to be translated is defined a priori, but selection of a proper or preferred lexical meaning among several equi-frequent meanings is a more complex problem.

Historically, it has been difficult to automate selection of specialized dictionaries and to find a proper, specific translation of a word based on an analysis of context and the subject field to which the text in question relates. Therefore, there is a substantial opportunity to improve this type of technology.

SUMMARY

Embodiments and discussion are presented herein regarding methods for identifying and selecting words in another language, a subject matter of an indicated word or expression, and a translation dictionary. Selection is based on a variety of available information, for example, semantics, syntax, context and historical information related to the particular selection task and personal data of the user. Historical information may include variants of translation that were previously selected within a translation project, types of texts previously translated by the user in translation sessions. Selection may be based on statistics as a document is translated such that as translation progresses, improved identification of translation variants and improved translation occur. Sources of information may be in a variety of formats. Selection may be found across a variety of formats including specialized dictionaries for a particular subject field, translations from regular, general dictionaries that are suitable for a given subject field, translations from dictionaries that are suitable for the given context of use, and examples of the use of a word in one or several sentences in the format of parallel texts in the given subject field. The context and/or subject matter may be determined both on the basis of semantic and syntactic analysis of the text and on the basis of statistical analysis of separate words.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings.

DETAILED DESCRIPTION

When completing a translation with an electronic dictionary, a translator (e.g., a person, computer program, combination of a person and automated system) chooses the subject matter by selecting a certain specialized dictionary in which descriptions are given of translations of notions, used in a given field, or of a particular word meaning from a dictionary entry, based on an understanding of the context for use.

The techniques described herein are designed to automate the selection and preferred use of certain dictionaries (specialized or otherwise). The techniques are also designed to automate selection of a proper variant of translation or word or word combinations based on analysis of context and the subject field to which the text in question relates. Selection of a correct translation of a word or combination of words is facilitated by automated analysis of context such as the subject matter of surrounding text (in general) and surrounding words (in particular). The context and subject matter may be determined both on the basis of a syntactic analysis and a semantic analysis of the text or a fragment of the text, and on the basis of a statistical analysis of separate words and groups of words and their combinability.

There are a lot of machine translation systems, statistical, rule-based or others, which can translate an entire text. But, often the quality of such translation does not satisfy most users or a user does not require a translation of the entire text. He/she may be interested in obtaining a proper translation of a word, term or notion, maybe, in getting more information about this meaning, such as, examples of using the word, compatibility of the word with other words, morphological models, for example, possible word forms, and/or syntactic models, for example, prepositions which can be used with the particular word.

Figure 1:
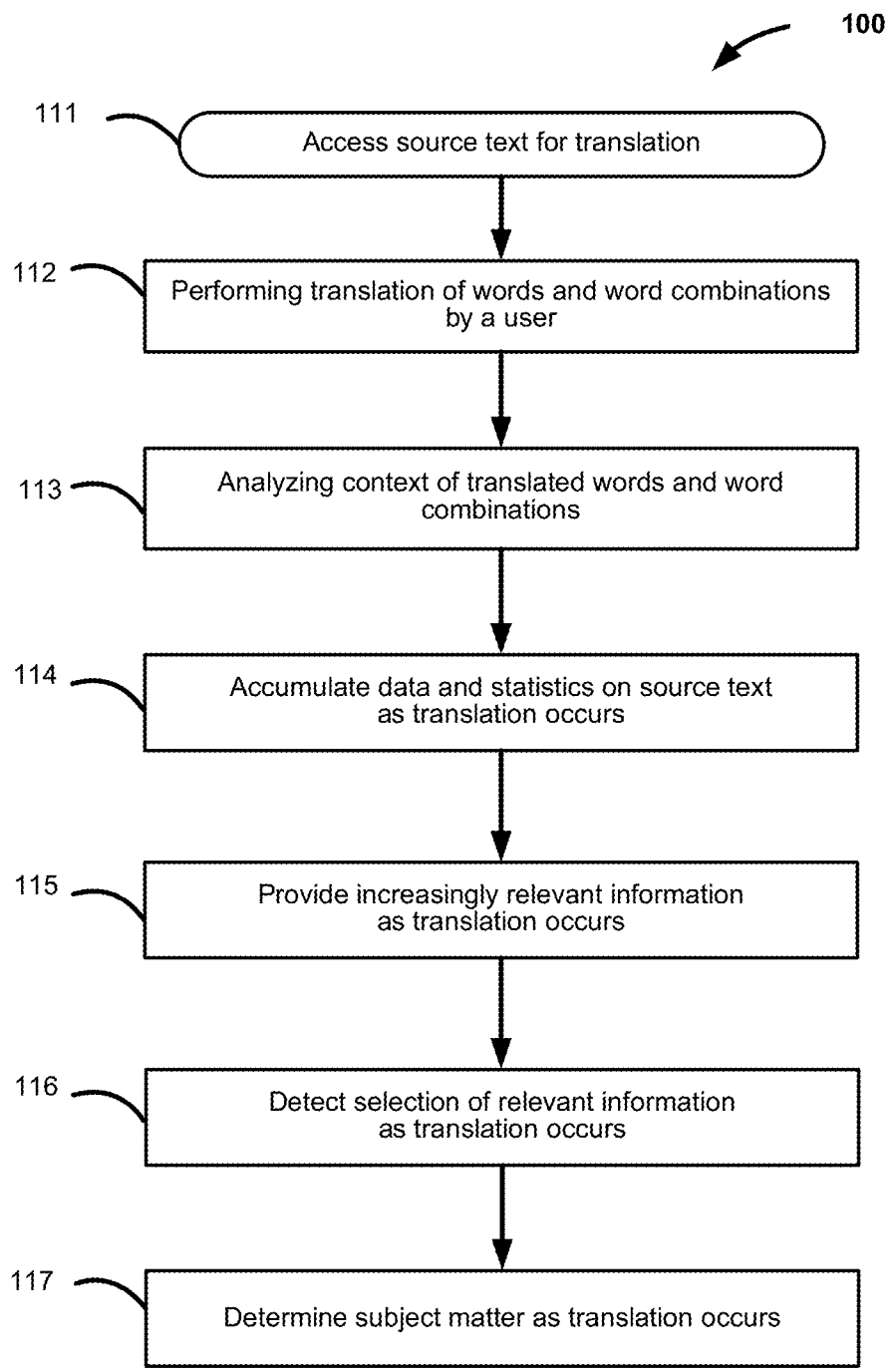
FIG. 1 is a flow diagram of a method according to one or more embodiments of the invention.

In one embodiment, the method of the present invention allows one to use MT systems and statistics as an additional auxiliary tool to reach the most adequate selection from electronic dictionaries. FIG. 1 is a flow diagram 100 of a method according to one or more embodiments of the invention. With reference to FIG. 1, a translation task performed with a mobile device or electronic computing device includes gaining access to a source text for translation 111. Translation is initiated. Translation may be done in steps (stepwise) or in a batch-like process. An electronic dictionary software assists a user in translating (112) and analyzing text. In an exemplary implementation, a user interface of such a dictionary software includes, for example, a pop-up (hover) translation tool. When a user meets an unknown word in a text, the user can point to the word with a mouse cursor (or touch a screen with a finger). A pop-up window may appear with a short translation of the word taken from an electronic dictionary based on analyzing (113) a surrounding context. If the user clicks on a translation in the pop-up window, he sees a full dictionary entry. A short translation function can help a user save time while reading and translating texts.

While translating separate words form and word combinations text information about their subject is analyzed and stored. The more words a translator translates, the more accurate subject of translated text the system can get. Also, information about the subject of surrounding words is collected if there is a possibility to identify them (i.e., a translator uses a hover translation). Any translation of words or words combination allows the system to accumulate (114) data and statistics on a source text. The translated words themselves are also collected and analysed. Each step and user action provides increasingly relevant information as translation occurs (115). In any moment the software tries to detect selection (115) of relevant information as translation occurs. Based on such detecting and other possible information about a user (e.g., age, education, occupation, interests) determining (116) a subject matter occurs when translation of a text is performed.

In such case, the system may select an appropriate lexical meaning for translating among other lexical meanings depending on a grammatical context, syntactic context, semantic context, or a combination of contexts. The main goal of gaining, acquiring or computing statistics is to identify the text subject, and, subsequently the dictionaries to be used in priority.

Most electronic dictionaries have a very large number of entries and they contain a lot of different homonyms and lexical meanings. Consequently, access to the whole entry content, selection of an appropriate meaning, and translation may require a considerable period of computational and actual time when a user translates a word from a text string. If entries of an electronic dictionary are provided by grammatical, syntactic and semantic markup, a user does not receive all variants of translation, but only those variants of translation which correspond to the subject matter and the context. Access or latency time is greatly reduced. At the same time, each lexical meaning of a particular dictionary entry is provided by a syntactic model, a semantic model or a combination of models.

For example, a user may refer or associate headwords and definitions to definite semantic fields and describe their basic syntactic patterns and contexts. The availability of such markup makes it possible to examine formal parameters of the context during analysis to get an appropriate translation of a word in a text. Thereby an electronic dictionary acquires the means to analyze context, basic semantics and grammar patterns for a particular word or phrase, and gives a user only one and most likely definition from a big dictionary entry when a user seeks a definition for the particular word or phrase, and this likely is the exact definition the user is looking for. In one embodiment of the invention, the context includes a current sentence. In another embodiment of the invention, the context includes more than one sentence, for example, a paragraph.

For example, the word "file" has several homonyms and several lexical meanings, and depending on a context, "file" may be translated as different parts of speech, and each part of speech may have several absolutely different meanings. The different meanings also likely have different syntactical models of usage. For description of such models of lexical meanings in the dictionary, the corresponding markup is used.

Figure 1A:
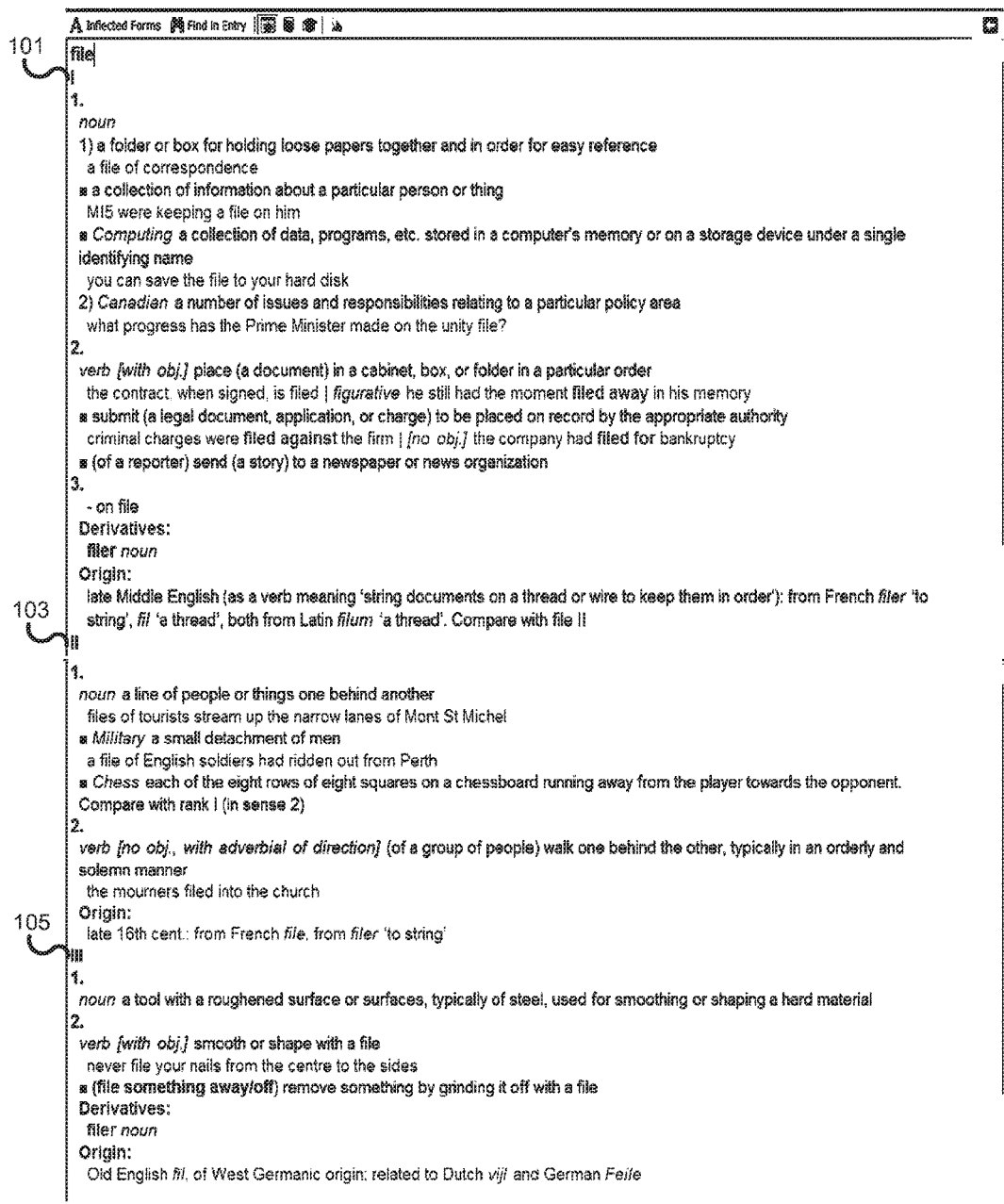
FIG. 1A shows an example of an entry in an electronic dictionary according to one or more embodiments of the invention.

FIG. 1A shows an example of the entry "file" in an electronic dictionary. With reference to FIG. 1A, the entry has three different homonyms which are designated with Roman numerals—I (101), II (103) and III (105), where, for example, the first homonym has three grammatical values including a noun (1.) and a verb (2.), and several lexical meanings—1) a folder or box; 2) a collection of information; 3) a collection of data, programs, etc. stored in a computer's memory. The meanings 1) and 2) may relate, for example, to topics "office work", "records management", "workflow", the 3) meaning—to "computing". The other meanings may have a specific meaning, for example, "Canadian" for "a number of issues and responsibilities relating to a particular policy area".

The second homonym II "a line of people or things one behind another" may be general, but if the translated text contains terms related to "military" or "chess", these meanings should be selected. The third homonym III is very specific, and if the translated text contains terms related to "metalwork", "tools", "instrument", this meaning should be selected.

The presence of a preposition, article, particle or other specific word before or after the translated word may govern the selection of the part of speech, but "to" may be a preposition, but may indicate an Infinitive of a verb. In such an indistinct case, other indications may be used.

Figure 1B:
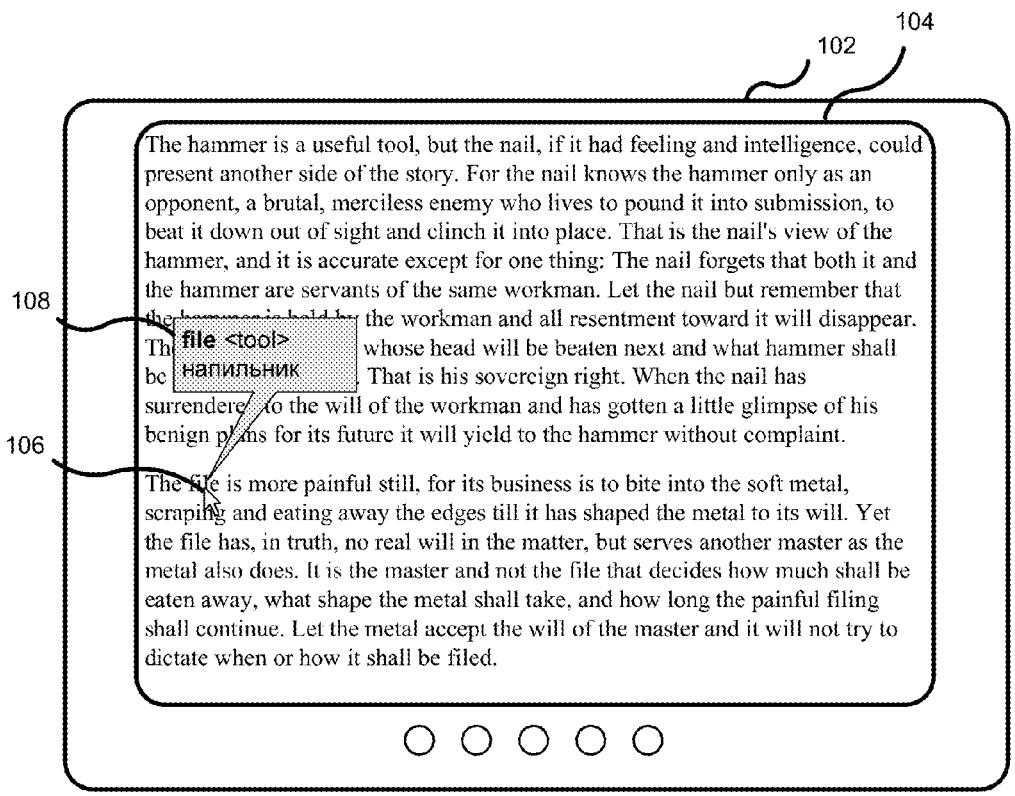
FIG. 1B shows an example of user interface according to one or more embodiments of the invention.

FIG. 1B shows an example of displaying an appropriate translation from a dictionary entry of a word selected by a user on a screen 104 of an electronic device 102, in accordance with one embodiment of the present disclosure. The user may select the word, for example, by means of a mouse cursor 106 or by a touch to the electronic device 102 or screen 104. The system displays a Russian translation "напильник" (=a tool with a roughened surface or surfaces) from an English-Russian dictionary because the lexical meaning is most appropriate for the context, for example, in a balloon 108 or in a tooltip.

In one embodiment of the present invention, the system may select an appropriate lexical meaning for translating among others depending on grammatical, syntactic and semantic context that may include one or more sentence of the translated text.

Context. In accordance with the subject matter of the translation and the context for their use, for best results, words in a foreign language should be translated according to values that are specific for the subject matter and the surrounding context. When performing a translation with an electronic dictionary, a translator preferably and manually chooses the subject matter by selecting a certain specialized dictionary. Such selecting may be done through a user interface element. A specialized dictionary is one in which descriptions are given of translations of notions used in a given field or of a particular word meaning from a dictionary entry. Such subject matter selection is made based on a personal understanding of the context of the source word or expression.

The instant invention automates selection (i.e., removes the need for manual selection) of one or more specialized dictionaries and provides specific variants of a word based on an analysis of context and the subject field to which the text in question relates.

Translation scenario. The following is a typical translation scenario when using techniques of the instant invention. When conducting a translation, a user proceeds to translate words and word combinations such as by typing an equivalent text in a second or target language. As a translator proceeds, a software or background functionality accumulates data on the selections or translations that are made in the source language and/or in the target language. As a result of such analysis and accumulated data, the software specifies one or more subject fields relevant to the text being translated. Also, analysis is performed on the basis of statistics and/or a semantic and syntactic breakdown of the text being translated—expression by expression, sentence by sentence, and paragraph by paragraph.

Possessing information on the subject field, one implementation includes software that provides ever increasingly relevant information on possible translations of a word, examples of use, and so on. One or more of the following items are offered to a user or translator: (1) specialized dictionaries corresponding to relevant subject field(s); (2) examples of translations from regular, general dictionaries that are suitable for the given subject field; (3) translations from dictionaries that are suitable for the given context of use; and (4) examples of use of a particular word in one or several sentences in the format of parallel texts in the given subject field. This list is merely exemplary of the information that possibly may be provided based on the on-going analysis of translation.

In this process, the translator does not have to select different dictionaries each time a translation is performed. Similarly, the translator is not repeatedly presented with a static list of several meanings for a word from a dictionary entry because the subject and context are taken into account. Instead, according to a preferred implementation, the translator is presented with an option of seeing additional information on the use of the word in the source language and possible translations into the target language. Such additional information includes examples of translations of different sentences and word combinations.

In another embodiment, the software may be preliminary trained. As the number of words and word combinations increases (as a translation session continues), the software receives more information, refines the subject field of the text being translated, and offers through a user interface to the translator more relevant translation results. The interface of software provides elements on the interface (e.g. button, balloon, footnote) that enable the user to start the translation training, and software elements for training to end. Also there are different settings to adapt and control the software training and translation process.

In still another embodiment, the text being translated may be entered as a whole to be preliminary analyzed. For such analyzing the system may provide lexical, syntactical and semantic analyses. For example, such analyses may be provided by methods described in U.S. Pat. No. 8,078,450 (the subject matter of which is hereby incorporated by reference). The system includes exhaustive linguistic descriptions to provide all steps of analysis of sentences, one of them is the step of lexical selection for each item of a sentence. If the lexical selection is executed in a preferred way, then a syntactic structure of the sentence is build, and non-tree links are established. The results of said lexical selection made in the process of analysis may be saved and used as suggestions during translating with use of a particular or selected electronic dictionary. The results of said lexical selection may also be used for collecting statistics about word usage and identifying one or more relevant subject matters.

Figure 2:
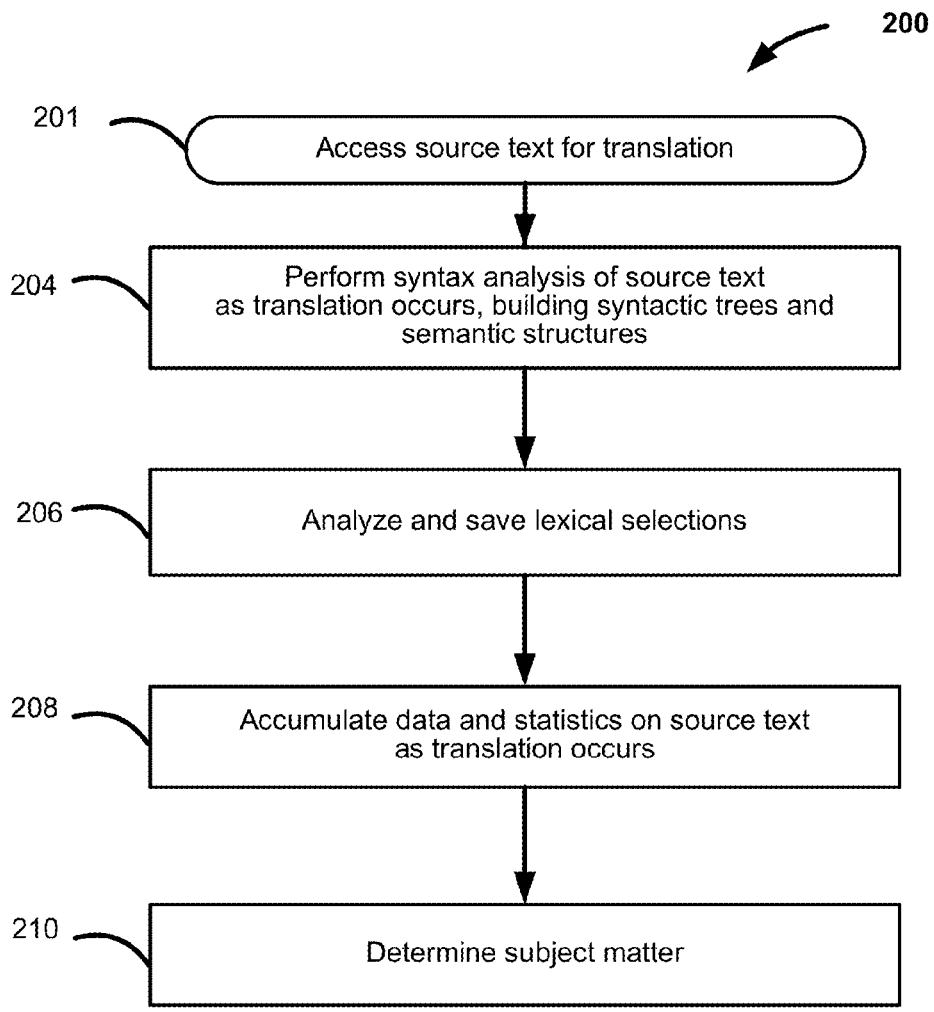
FIG. 2, FIG. 2A, FIG. 3, FIG. 4 and FIG. 5 are flow diagrams of steps of exemplary implementations of the invention.
Figure 2A:
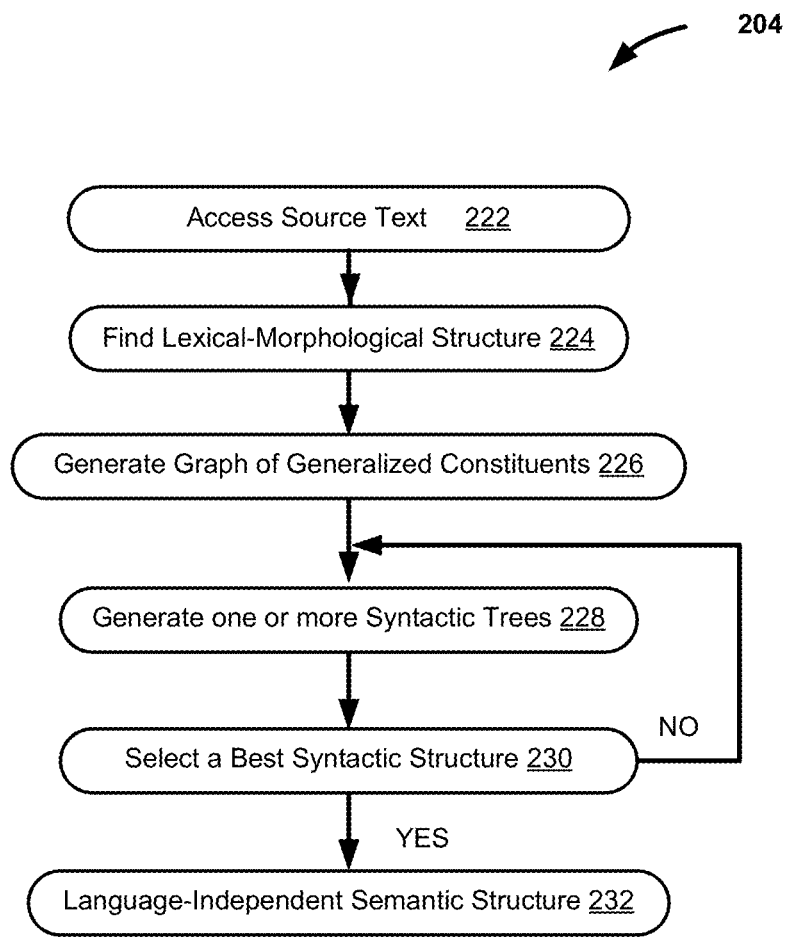

FIG. 2 shows steps of a method according to the present invention using a preliminary analysis of a text to be translated for collecting information about semantics, statistics and about lexical selection. FIG. 2A shows steps of analyzing (204) as detailed herein according to one or more embodiments of the invention. With reference to FIG. 2A, a source text is accessed 222—opened and analyzed as part of a translation session. A lexical-morphological structure for each source sentence of the source text is found 224 as the translation session progresses. Lexical-morphological structures may be found or created using linguistic descriptions, lexical descriptions, morphological descriptions, syntactic descriptions and semantic descriptions of the source language provided by the system. A graph of generalized constituents is generated 226. One or more syntactic trees are generated 228. If successfully identified from the analysis, a best, preferred or most accurate syntactic structure is selected 230. From the best syntactic structure, a language-independent semantic structure is constructed 232. The language-independent semantic structure represents the meaning of the source sentence. From this information, a more informed selection of a variant or dictionary may be performed.

Particularly, the step 230 (FIG. 2A) of selecting a best syntactic structure includes the process of lexical selection, that means a selection of a most proper lexical meaning of a word among a set of possible lexical meanings. If the selection was made incorrectly, the next steps, such as establishing non-tree links may fail, and, as result, a syntactic structure cannot be built. If the syntactic structure is built successfully, it means the task of lexical disambiguation is resolved, and the result of the lexical selection may be kept, analyzed and taken into account. Specifically, the data of lexical selections is the basis of statistics in defining a subject matter.

Additionally, in one embodiment, each lexical meaning in an electronic dictionary may be connected to a lexical-semantic hierarchy. The semantic hierarchy is a tree-like, parent-child structure including lexical meanings and semantic classes. Each lexical meaning in the lexical-semantic hierarchy has its surface (syntactical) model which includes one or more syntforms, as well as, idioms and word combinations with the lexical meaning. Syntforms may be considered as "patterns" or "frames" of usage. Every syntform may include one or more surface slots with their linear order description, one or more grammatical values expressed as a set of grammatical characteristics (grammemes), and one or more semantic restrictions on surface slot fillers. Semantic restrictions on a surface slot filler are a set of semantic classes, whose objects can fill this surface slot.

The semantic classes are semantic notions (semantic entities) and named semantic classes are arranged into one or more semantic hierarchies—hierarchical parent-child relationships—similar to a tree. In general, a child semantic class inherits most properties of its direct parent and all ancestral semantic classes. For example, semantic class SUBSTANCE is a child of semantic class ENTITY and the parent of semantic classes GAS, LIQUID, METAL, WOOD_MATERIAL, etc.

The semantic hierarchy is a universal, language-independent structure, and the semantic classes may include lexical meanings of various languages, which have some common semantic properties and may be attributed to the same notion, phenomenon, entity, situation, event, object type, property, action, and so on. Semantic classes may include many lexical meanings of the same language, which differ in some aspects and which are expressed by means of distinguishing semantic characteristics (semantemes). Semantemes express various properties of objects, conditions and processes that may be described in the language-independent semantic structure and expressed in natural languages grammatically and syntactically (for example, number, gender, aspect and tense of actions, degree of definiteness, modality, etc.), or lexically. So, lexical meanings are provided with distinguishing semantemes.

Each semantic class in the semantic hierarchy is supplied with a deep model. The deep model of the semantic class is a set of the deep slots, which reflect the semantic roles in various sentences. The deep slots express semantic relationships, including, for example, "agent", "addressee", "instrument", "quantity", etc. A child semantic class inherits and adjusts the deep model of its direct parent semantic class.

Additionally, semantic classes and lexical meanings may be marked by semantemes. The system of semantemes includes language-independent semantic attributes which express not only semantic characteristics but also stylistic, pragmatic and communicative characteristics. Some semantemes can be used to express an atomic meaning which finds a regular grammatical and/or lexical expression in a language. For example, the semantemes may describe specific properties of objects (for example, "being flat" or "being liquid") and are used in the descriptions as restriction for deep slot fillers (for example, for the verbs "face (with)" and "flood", respectively). The other semantemes express the differentiating properties of objects within a single semantic class, for example, in the semantic class HAIRDRESSER the semanteme <<RelatedToMen>> is assigned to the lexical meaning "barber", unlike other lexical meanings which also belong to this class, such as "hairdresser", "hairstylist", etc.

Lexical meanings may be provided by a pragmatic description which allows the system to assign a corresponding theme, style or genre to texts and objects of the semantic hierarchy. For example, "Economic Policy", "Foreign Policy", "Justice", "Legislation", "Trade", "Finance", etc. Pragmatic properties can also be expressed by semantemes. For example, pragmatic properties may be taken into consideration during the translation words in context of neighboring and surrounding words and sentences.

So when the electronic dictionary software tries to find an appropriate lexical meaning for the current word to translate it into another natural language, the system, at first, finds its one or more morphological lemma, and when the system finds more than one lexical meaning corresponding to the lemma, the system analyzes the syntactic, semantic and pragmatic context which may include one or more neighboring and surrounding words or sentences. Then, the system may select an appropriate lexical meaning from the dictionary on the basis of such a context analysis.

With reference to FIG. 1B, and for example, the "proximity" of some lexical meanings in the semantic hierarchy may be taken into account when the appropriate lexical meaning must be selected on the basis of analyzing the pragmatic and semantic context during translating. In other words, if the words "file" and "hammer", which have the common parent—the semantic class INSTRUMENT, are occurred in some surrounding context, then the meaning "a tool with a roughened surface" should be selected for translating. Otherwise, if the words, for example, "save", "folder", "open" etc., which have the common parent—the semantic class COMPUTER, are occurred in some surrounding context with the "file", then the meaning "a data, programs, etc. stored in a computer's memory or on a storage device under a single identifying name" should be selected for translating. Regarding the implementation of the method, the preferable meaning belonging to some semantic class may be selected based on the presence in the text other meanings belonging to the same semantic class or belonging to other semantic classes located "near" in the semantic hierarchy. The measure of proximity for two lexical meanings or semantic classes may be based on "distance" between them in the semantic hierarchy.

Of course, the correspondence of neighboring and surrounding words to the patterns described in syntforms also may be taken into account during lexical meaning selection.

Figure 3:
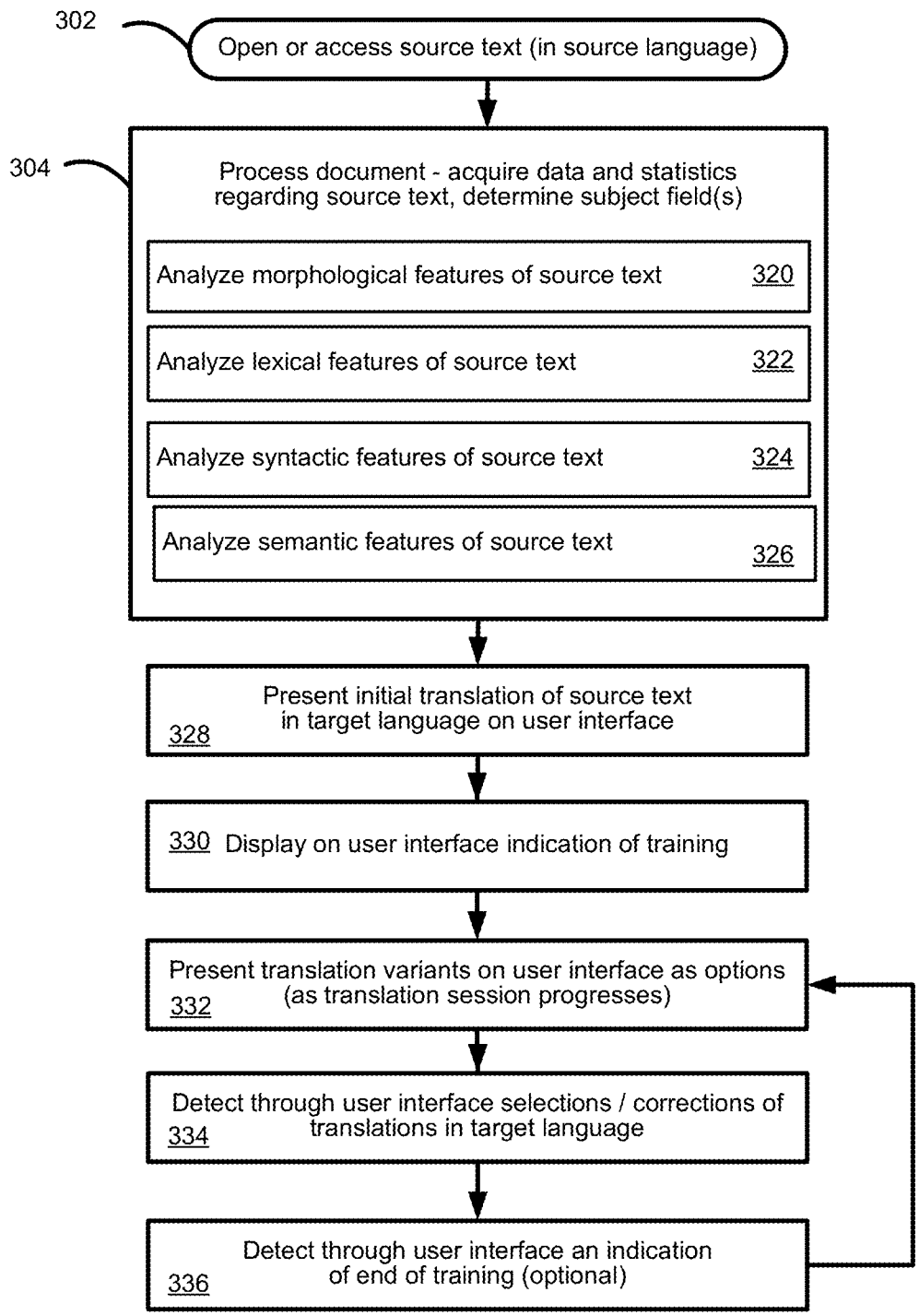

FIG. 3 is a flow diagram of a method according to one or more embodiments of the invention. FIG. 3 provides further details as to acquiring data and statistics 114 (referring to FIG. 1) in one embodiment of the invention. With reference to FIG. 3, processing of a document 304 includes analyzing lexical features of the source text 322, and morphological features of items (words) of the source text 320. It means, for each word form, presented in the source text, all possible lemmas are found. It means also, that all possible lexical meanings of the source words are identified. After that, syntactic features of the source text may be analyzed 324. The semantic features of the source text also may be analyzed 326. Said analyzing the semantic features may include not only building semantic structures, but also analyzing the distribution of lexical meanings (vocabulary) along semantic classes, or more widely, along fields of knowledge. The method further includes presenting an initial translation of source text in a target language through a user interface 328. Preferably, an indication of training is displayed on the user interface 330. Translation variants 332 are displayed or presented as options as the translation session progresses. An element of an operating system or user interface detects selections or corrections of the translation 334 in the target language. A user may optionally wish to stop training. To do so, the user interface detects an indication of ceasing of training 336. Translation and/or correcting during a translation session may continue until a user or machine algorithm reaches the end of a particular text, or wishes to interrupt the translation task or session.

Figure 4:
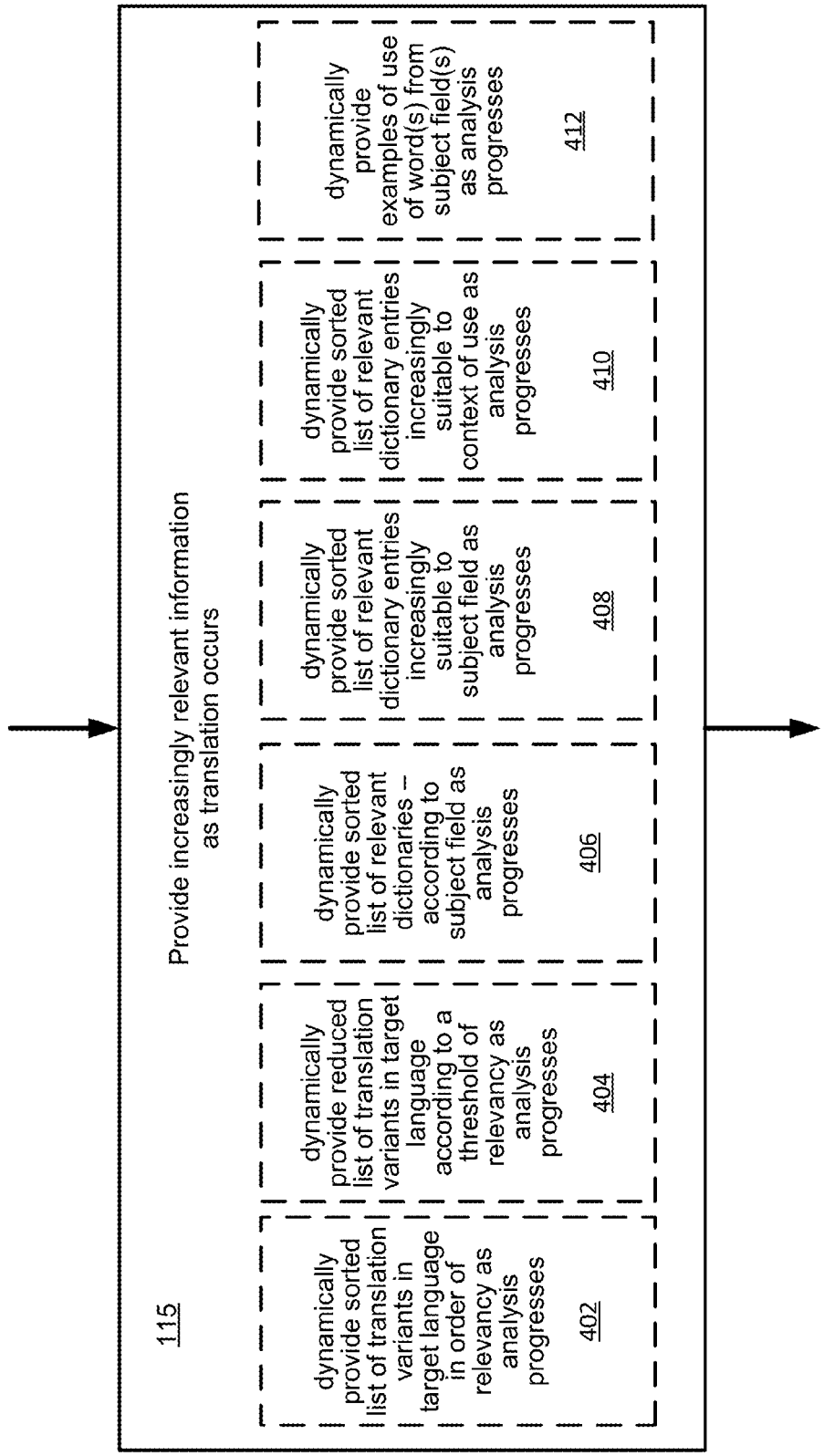

FIG. 4 illustrates a flow diagram of exemplary implementations of providing increasingly relevant information as translation occurs such as found at step 115 of FIG. 1. With reference to FIG. 4, step 115 may include dynamically providing a sorted list of translation variants in a target language in an order of relevancy as analysis (translation) progresses (step 402). Relevancy is in relation to, for example, the source text or subject matter of the source text, or in relation to words about the subject matter in the target language. Step 115 may also include dynamically providing a reduced list of translation variants in a target language according to a threshold of relevancy as analysis (translation) progresses (step 404). Step 110 may also include dynamically providing a sorted list of relevant dictionaries according to a subject field as analysis (translation) progresses (step 406). Step 115 may also include dynamically providing a sorted list of relevant dictionary entries increasingly suitable to a subject field as analysis (translation) progresses (step 408). Step 115 may also include dynamically providing a sorted list of relevant dictionary entries increasingly suitable to a context of use as analysis (translation) progresses (step 410). Step 115 may also include dynamically providing examples of use of word(s) from a relevant subject field or fields as analysis (translation) progresses (step 412). Such providing includes presenting or displaying on a user interface of an electronic device.

Figure 5:
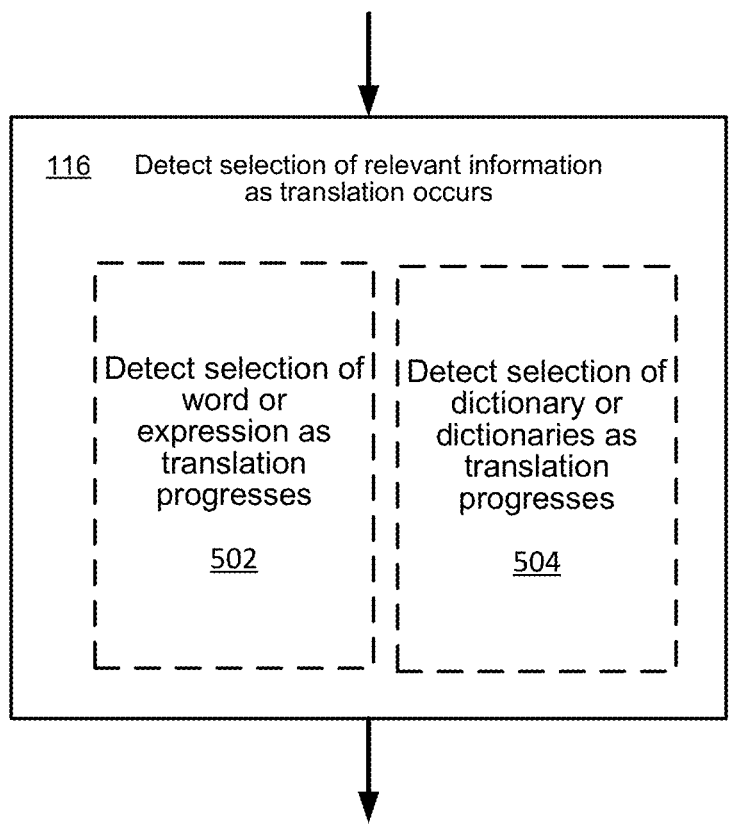

FIG. 5 illustrates a flow diagram of exemplary implementations of detecting selection of relevant information as translation occurs such as found at step 116 of FIG. 1. With reference to FIG. 5, step 116 may include detecting selection of a word or expression as translation progresses (step 502). Step 116 also may include detecting selection of a dictionary or dictionaries as translation progresses (step 504).

Several scenarios are exemplary of various implementations or embodiments of how the invention operates. In a preferred implementation, a software interface offers a number of different settings for a user to control how the analysis operates. The software interface facilitates each of the several scenarios.

Scenario 1

Preliminary training. A user opens the software and opens a source text to be translated. The software, through the user interface, suggests that the software is given access to and allowed to process the entire text. The user indicates in the affirmative through a user interface element. The software performs statistical and/or semantic and syntactic analyses, and the subject matter of the text is determined. The translation session begins. As translation proceeds, when the translator (and translation software) encounters an unknown word or combination of words, the user is offered (such as through the user interface) relevant information to perform the translation correctly into the target language based upon the information gained from the statistical and/or semantic and syntactic analyses.

Scenario 2

Gradual training. A user opens the software and opens a source text to be translated. The user (and software) translates a few words and/or word combinations (in sequence). As each translation is made, the software accumulates an array of the translated words and word combinations. The software offers to the user, through a user interface element, a certain subject matter. The user is free to choose to accept or reject the suggestion. If the user accepts, during subsequent translations, relevant information is given for translating words and word combinations into the target language. If the user does not agree with the suggested subject matter, the user may indicate, independently of the software, the subject matter such as through a particular user interface feature or mechanism related to a configuration or configuration setting. The user may opt to cease or stop the software from "training" or analyzing the user's selections and translations.

Scenario 3

Guided Translation. A user operates the translation software on the same device when reading or translating a text from any other software, program, operating system, etc. in which the given text is displayed. The user desires to translate a certain word or word combination without leaving the interface of other software. The user selects the word or word combination in the other (non-translation) software where the source text is presented. Next, the translation software captures (or gains access to) the word or word combination. The translation software takes not only the word or word combination, but also takes a sufficient number of words to the right and left of the word or word combination that has been selected. The translation software optionally takes or gains access to the contextual sentences or paragraphs—without indication or input by a user. The translation software analyzes the context and subject matter based on the initially selected word or word combination.

The translation software conducts statistical and/or semantic and syntactic analysis of what comes around the word or word combination and on the basis of the obtained subject matter and context. The translation software issues relevant information for the translation of the given word or word combination into the target language. The translation software also facilitates viewing closest specimen translations from a database of parallel texts for the given word or word combination, allowing for taking into account the context of use and subject matter of the word or word combination selected by the user.

Figure 6:
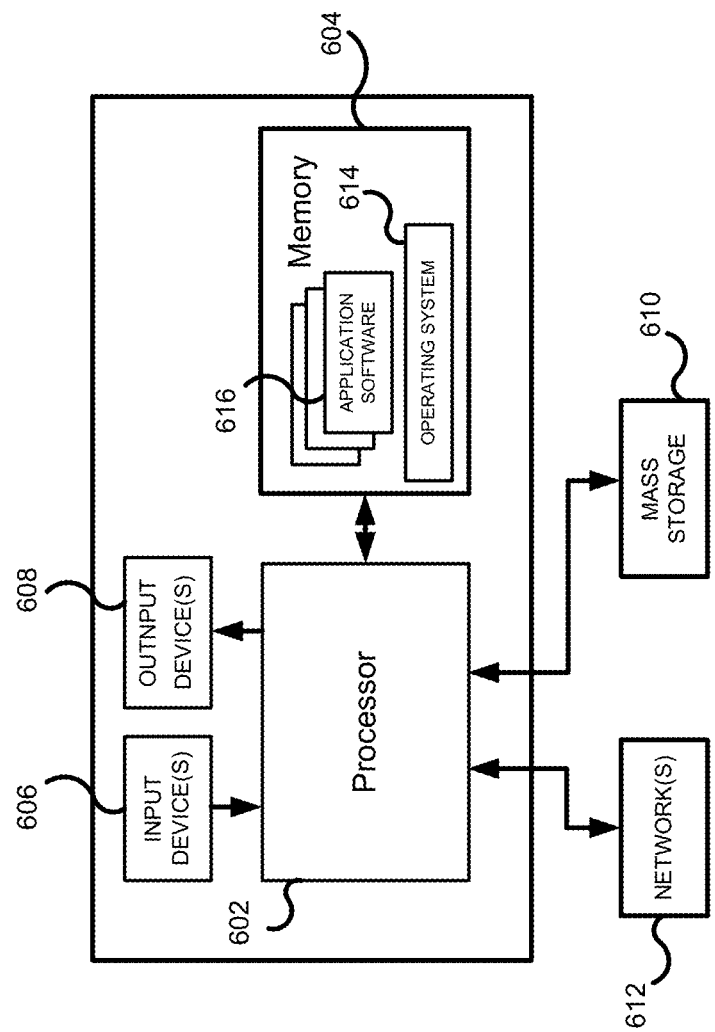
FIG. 6 is a block diagram of a hardware device for performing methods in accordance with embodiments of the invention.

FIG. 6 shows exemplary hardware for implementing the techniques and systems described herein, in accordance with one implementation of the present disclosure. Referring to FIG. 6, the exemplary hardware 600 includes at least one processor 602 coupled to a memory 604. The processor 602 may represent one or more processors (e.g. microprocessors), and the memory 604 may represent random access memory (RAM) devices comprising a main storage of the hardware 600, as well as any supplemental levels of memory, e.g., cache memories, non-volatile or back-up memories (e.g. programmable or flash memories), read-only memories, etc. In addition, the memory 604 may be considered to include memory storage physically located elsewhere in the hardware 600, e.g. any cache memory in the processor 602 as well as any storage capacity used as a virtual memory, e.g., as stored on a mass storage device 610.

The hardware 600 also typically receives a number of inputs and outputs for communicating information externally. For interface with a user or operator, the hardware 600 may include one or more user input devices 606 (e.g., a keyboard, a mouse, imaging device, scanner, microphone) and a one or more output devices 608 (e.g., a Liquid Crystal Display (LCD) panel, a sound playback device (speaker)). To embody the present invention, the hardware 600 typically includes at least one screen device.

For additional storage, the hardware 600 may also include one or more mass storage devices 610, e.g., a floppy or other removable disk drive, a hard disk drive, a Direct Access Storage Device (DASD), an optical drive (e.g. a Compact Disk (CD) drive, a Digital Versatile Disk (DVD) drive) and/or a tape drive, among others. Furthermore, the hardware 600 may include an interface with one or more networks 612 (e.g., a local area network (LAN), a wide area network (WAN), a wireless network, and/or the Internet among others) to permit the communication of information with other computers coupled to the networks. It should be appreciated that the hardware 600 typically includes suitable analog and/or digital interfaces between the processor 602 and each of the components 604, 606, 608, and 612 as is well known in the art.

The hardware 600 operates under the control of an operating system 614, and executes various computer software applications, components, programs, objects, modules, etc. to implement the techniques described above. Moreover, various applications, components, programs, objects, etc., collectively indicated by application software 616 in FIG. 6, may also execute on one or more processors in another computer coupled to the hardware 600 via a network 612, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as a "computer program." A computer program typically comprises one or more instruction sets at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally to actually effect the distribution regardless of the particular type of computer-readable media used. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

In the above description, for purposes of explanation, numerous specific details are set forth in order to provide a thorough understanding of the invention. It should be apparent, however, to one skilled in the art that the invention can be practiced without these specific details.

Reference in this specification to "one embodiment" or "an implementation" means that a particular feature, structure, or characteristic described in connection with the embodiment is included in at least one implementation of the invention. The appearances of the phrase "in one embodiment" or "in one implementation" in various places in the specification are not necessarily all referring to the same embodiment or implementation, nor are separate or alternative embodiments mutually exclusive of other embodiments. Moreover, various features are described which may be exhibited by some embodiments and not by others. Similarly, various requirements are described which may be requirements for some embodiments but not for other embodiments.

Certain exemplary embodiments have been described, and such embodiments are merely illustrative and not restrictive—this invention is not limited to the specific constructions and arrangements shown and described, since various other modifications may occur to those ordinarily skilled in the art upon studying this disclosure. The disclosed embodiments may be readily modified or rearranged in one or more of their details as facilitated by enabling technological advancements without departing from the principals of the present disclosure.

We claim:

1. A method comprising:
generating, by at least one processor, a first translation of a first portion of a source text into a target language, wherein generating comprises extracting at least one first lexical meaning of the first portion;
selecting, by the processor, a first semantic class for the first lexical meaning from one or more first semantic classes in a semantic hierarchy, wherein the first semantic class corresponds to the first lexical meaning in the semantic hierarchy;
extracting, by the processor, a plurality of lexical meanings of a second portion of the source text, wherein the semantic hierarchy comprises a plurality of second semantic classes corresponding to the lexical meanings;
selecting, by the processor, at least one second lexical meaning for the second portion from the lexical meanings based on distances between the second semantic classes and the first semantic class within the semantic hierarchy;
generating, by the processor, a second translation of the second portion into the target language based on the selected second lexical meaning; and
outputting the generated second translation.

2. The method of claim 1, further comprising selecting a translation dictionary from a plurality of translation dictionaries, wherein the selected translation dictionary is used in the generation of the second translation.

3. The method of claim 2, wherein the selection of the translation dictionary is based on a selected subject matter of the first portion.

4. The method of claim 1, further comprising identifying an instance of a plurality of parallel texts based on a selected subject matter of the first portion.

5. The method of claim 4, wherein each of the plurality of parallel texts comprises a sequence of words.

6. The method of claim 4, wherein each of the plurality of parallel texts comprises one or more sentences.

7. The method of claim 1, further comprising:
identifying a plurality of translation variants for a word or expression in the second translation; and
outputting the plurality of translation variants in an order of relevancy.

8. The method of claim 1, further comprising:
identifying a plurality of translation variants for a word or expression in the second translation;
identifying a respective relevancy value for each of the plurality of translation variants; and
outputting one or more of the plurality of translation variants whose respective relevancy value exceeds a threshold value.

9. The method of claim 1, wherein the extraction of the first lexical meaning and the second lexical meanings is based on one or more lexical descriptions of a source language of the source text.

10. The method of claim 1, wherein the extraction of the first lexical meaning and the second lexical meanings is based on one or more lexical selections.

11. The method of claim 1, wherein the extraction of the first semantic meaning and the second lexical meanings is based on a deep linguistic analysis of the source text.

12. A system comprising:
at least one memory to store a source text; and
at least one processor, operatively coupled to the memory, configured to:
generate a first translation of a first portion of the stored source text into a target language, wherein, to generate the first translation, the processor is to extract at least one first lexical meaning of the first portion;
select a first semantic class for the first lexical meaning from one or more first semantic classes in a semantic hierarchy, wherein the first semantic class corresponds to the first lexical meaning in the semantic hierarchy;
extract a plurality of lexical meanings of a second portion of the source text, wherein the semantic hierarchy comprises a plurality of second semantic classes corresponding to the lexical meanings;
select at least one second lexical meaning for the second portion from the lexical meanings based on distances between the second semantic classes and the first semantic class within the semantic hierarchy;
generate a second translation of the second portion into the target language based on the selected second lexical meaning; and
output the generated second translation.

13. The system of claim 12, wherein the processor is further configured to select a translation dictionary from a plurality of translation dictionaries, and wherein the selected translation dictionary is used in the generation of the second translation.

14. The system of claim 13, wherein the selection of the translation dictionary is based on a selected subject matter of the first portion.

15. The system of claim 12, wherein the processor is further configured to identify an instance of a plurality of parallel texts based on a selected subject matter of the first portion.

16. The system of claim 15, wherein each of the plurality of parallel texts comprises a sequence of words.

17. The system of claim 15, wherein each of the plurality of parallel texts comprises one or more sentences.

18. The system of claim 12, wherein the processor is further configured to:
identify a plurality of translation variants for a word or expression in the second translation; and
output the plurality of translation variants in an order of relevancy.

19. The system of claim 12, wherein the processor is further configured to:
identify a plurality of translation variants for a word or expression in the second translation;
identify a respective relevancy value for each of the plurality of translation variants; and
output one or more of the plurality of translation variants whose respective relevancy value exceeds a threshold value.

20. A non-transitory computer-readable medium having instructions stored therein that, when executed by at least one processor, cause the processor to:
generate, by the processor, a first translation of a first portion of a source text into a target language, wherein, to generate the first translation, the instructions cause the processor to extract at least one first lexical meaning of the first portion;
select, by the processor, a first semantic class for the first lexical meaning from one or more first semantic classes in a semantic hierarchy, wherein the first semantic class corresponds to the first lexical meaning in the semantic hierarchy;
extract, by the processor, a plurality of lexical meanings of a second portion of the source text, wherein the semantic hierarchy comprises a plurality of second semantic classes corresponding to the lexical meanings;
select, by the processor, at least one second lexical meaning for the second portion from the lexical meanings based on distances between the second semantic classes and the first semantic class within the semantic hierarchy;
generate, by the processor, a second translation of the second portion into the target language based on the selected second lexical meaning; and
output the generated second translation.

* * * * *